UNITED STATES PATENT OFFICE.

ERIC HJALMAR WESTLING AND CARL ANDERSEN, OF SAN FRANCISCO, CALIFORNIA; SAID WESTLING ASSIGNOR OF HIS ONE-HALF TO NEWTON W. STERN, OF SAN FRANCISCO, CALIFORNIA.

PROCESS OF MAKING FERRO-MOLYBDENUM.

1,278,408.  Specification of Letters Patent.  Patented Sept. 10, 1918.

No Drawing.  Application filed November 18, 1916.  Serial No. 132,114.

*To all whom it may concern:*

Be it known that we, ERIC HJALMAR WESTLING, a citizen of the United States, and CARL ANDERSEN, a subject of Denmark, and residents of the city and county of San Francisco and State of California, have jointly invented a Process of Making Ferro-Molybdenum, of which the following is a specification.

The invention relates to a process of making ferro-molybdenum.

An object of the invention is to provide a process of making ferro-molybdenum.

The invention possesses other advantageous features, some of which, with the foregoing, will be set forth at length in the following description where we shall outline in full the process of our invention. It is to be understood however that variations in the process may be made without departing from the invention as expressed in the succeeding claim.

The first step in our process consists in precipitating molybdic acid from its solution in such a manner as to form a combination with ferric iron. This may be accomplished in two ways, depending upon the state in which the molybdic acid occurs in the solution.

If the molybdic acid occurs as an ammonium molybdate, sodium molybdate or other alkaline or soluble molybdate, we add a ferric salt of a strong acid, such as ferric sulfate. The simplest form of the attendant reaction may be expressed as follows:

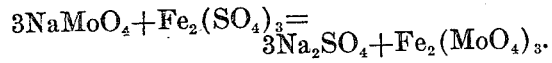

$$3NaMoO_4 + Fe_2(SO_4)_3 = 3Na_2SO_4 + Fe_2(MoO_4)_3.$$

If the molybdic acid should occur in acid solution, such as molybdic nitrate or sulfate, in the presence of a ferric salt, we neutralize the solution by adding thereto a sodium or ammonium or other alkaline carbonate or hydroxid, or calcium or other alkaline earth carbonate or hydroxid. The simplest form of the attendant reaction may be expressed as follows:

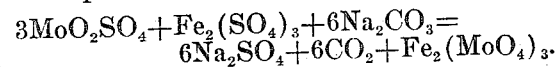

$$3MoO_2SO_4 + Fe_2(SO_4)_3 + 6Na_2CO_3 = 6Na_2SO_4 + 6CO_2 + Fe_2(MoO_4)_3.$$

If the solution does not contain at the beginning enough of the ferric salt, it should be added thereto before neutralization takes place.

We realize that the reactions as expressed essentially by the foregoing equations and which yield essentially the same product of combination between molybdic acid and iron oxid, are complicated by the tendency of molybdic acid to form complex acids and salts, depending on conditions of temperature, pressure and concentration, as well as ionic concentration depending on what particular base is used, and other conditions, but we find that for all practical purposes this condition is of no material importance, as all the different combinations between molybdic acid and iron that we have examined have essentially the same useful and valuable property of being insoluble in water. Also, it will not take up copper or other divalent ions until the ferric iron is satisfied first. This makes it possible to produce a ferric molybdate, free from copper and other divalent metals.

A salt of the approximate composition as given in the equations above containing about one molecule of ferric oxid to three molecules of molybdic acid, we have found to be very readily formed. It is yellow, of fine chrystalline texture, and insoluble in water. It contains a certain amount of water of chrystallization; the exact amount at different temperatures we have not yet definitely determined. There is another salt formed when ferric iron exists in the solution in larger quantity than expressed by the ratio of one molecule of ferric oxid to three molecules of molybdic acid. It is a light brown precipitate and contains one molecule of $Fe_2O_3$ to one molecule of $MoO_3$.

The ferric molybdate precipitated in either or both of the above reactions is then separated from the solution and reduced with carbon or hydrogen, or both, in the presence of a reducing or indifferent atmosphere at a comparatively low temperature, from 500° C. to 900° C. to produce ferro-molybdenum. The intimate molecular connection already existing between the iron and molybdenum in the molybdate makes it possible to produce a homogeneous ferro-molybdenum without melting the compound. By mixing the yellow and brown precipitates in the proper proportion, any ratio of iron and molybdenum in the ferro-molybdenum may be obtained within the limits determined by either precipitate. The ferro-molybdenum so obtained is a homogeneous, spongy product which may be broken or ground into finely divided particles, if desired. This ferro-molybdenum is not readily oxidized and is readily dissolved in molten iron, producing a homogeneous molybdenum steel.

In practice we subject the ferric molybdate in a rotary vessel of iron or other suitable material to a stream of reducing gas and apply heat thereto. The water of crystallization is driven off at a low temperature and at a higher temperature, the reduction of the ferric molybdate to ferro-molybdenum occurs.

We claim:

The process of making ferro-molybdenum from an acid solution of molybdic acid containing a ferric salt, which consists in neutralizing the solution with an alkaline basic compound whereby ferric molybdate is precipitated, separating the precipitate from the solution and heating the precipitate in the presence of a reducing agent.

In testimony whereof we have hereunto set our hands at San Francisco, California, this 10th day of November, 1916.

ERIC HJALMAR WESTLING.
CARL ANDERSEN.

In presence of—
H. G. PROST,
W. W. HEALEY.